Sept. 26, 1961 A. E. NALL, JR 3,002,148
EARTH FORMATION LOGGING METHOD AND APPARATUS
Filed April 30, 1958 2 Sheets-Sheet 1
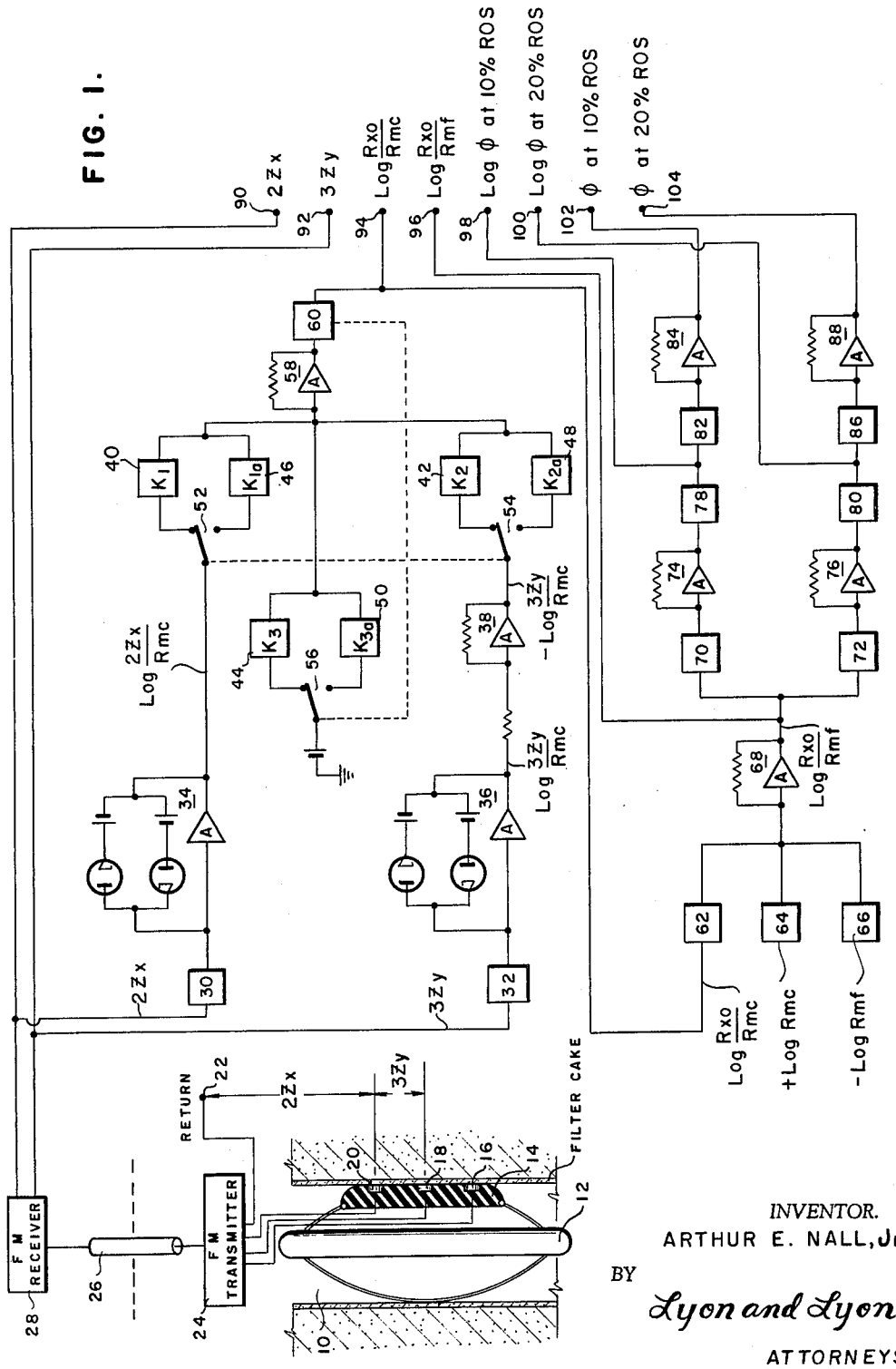
INVENTOR.
ARTHUR E. NALL, Jr.,
BY
*Lyon and Lyon*
ATTORNEYS.

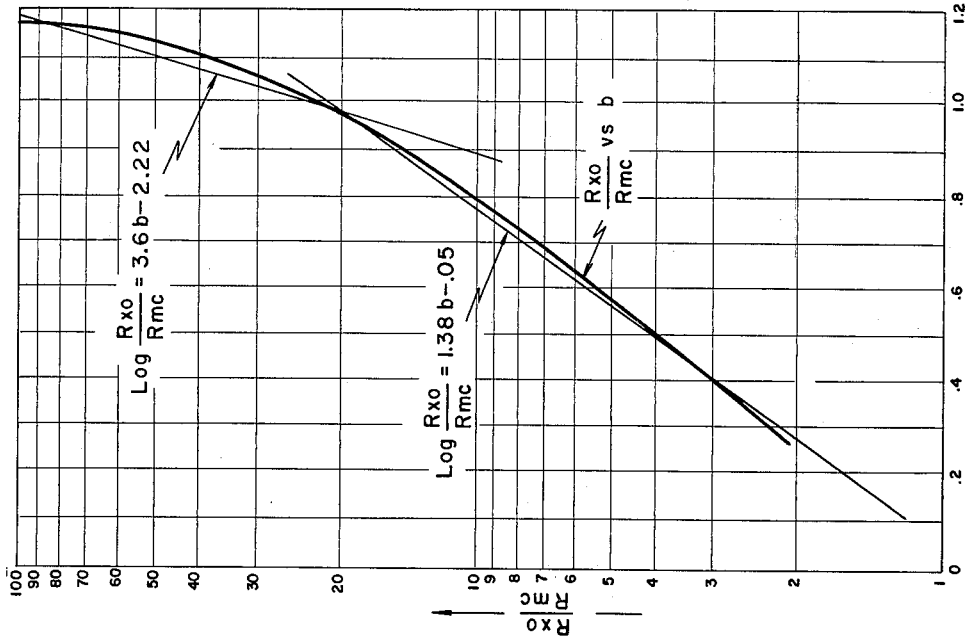
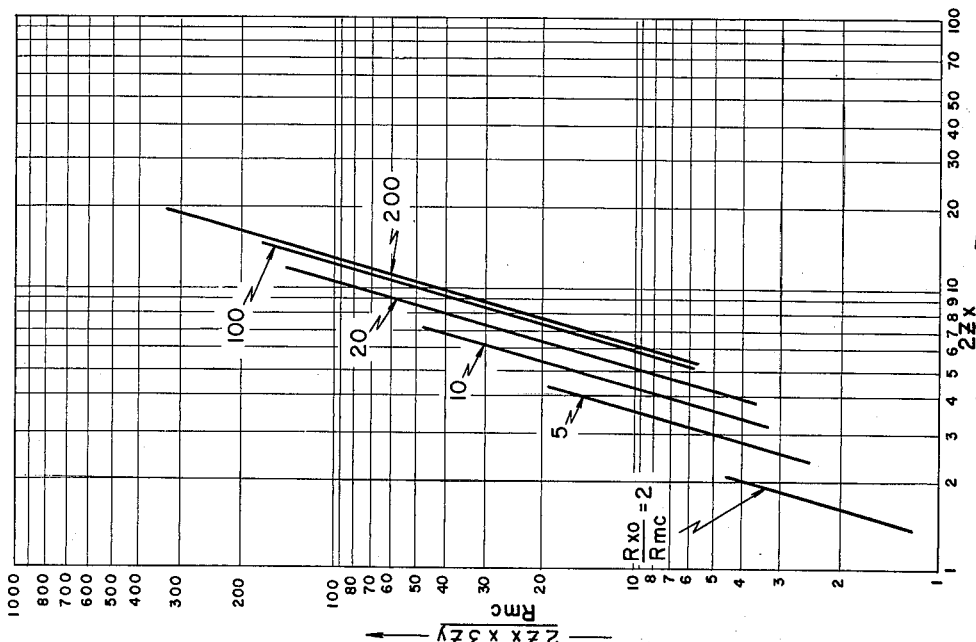

United States Patent Office

3,002,148
Patented Sept. 26, 1961

3,002,148
EARTH FORMATION LOGGING METHOD AND APPARATUS
Arthur E. Nall, Jr., Houston, Tex., assignor to Halliburton Company, a corporation of Delaware
Filed Apr. 30, 1958, Ser. No. 731,953
16 Claims. (Cl. 324—1)

This invention generally relates to the electrical resistivity logging of earth formations and more particularly relates to a method and apparatus for producing a direct and continuous indication of the porosity of such formations.

When a well bore is drilled the drilling mud loses filtrate to adjacent permeable formations and a mud filter cake is deposited about the inner periphery of the bore. Each particular mud has a particular rate of filtrate loss and resulting mud cake build-up. Such mud cake is characteristically of low permeability, usually between $10^{-5}$ and $10^{-7}$ millidarcy. After the first thin sheath of the mud cake is formed, the mud cake permeability is of greater influence upon further loss of filtrate than the permeability of the formation behind the mud cake.

In a formation containing hydrocarbons and water, the invading mud filtrate first displaces a portion of the hydrocarbons. The proportion of hydrocarbons displaced is a variable depending on the formation, the type of water contained on the formation, the type of mud filtrate, and the type of hydrocarbon. After a large portion of the hydrocarbons is displaced, intimate contact occurs between the interstitial formation water and the mud filtrate, permitting ion exchange and mixing. Since the mud filtrate resistivities are generally higher than the normal formation water resistivities, the resulting ion exchange results in replacement of less resistive waters with more resistive waters. It is currently believed that flushing of the porous zone with three volumes of the mud filtrate results in complete replacement of the original interstitial water with fluid of the same resistivity as the mud filtrate.

A method and apparatus, generally termed contact logging, of measuring the electrical resistivities of small volumes adjacent to the bore wall or in regions locally invaded by the mud filtrate is in present use. Such systems generally employ an insulated resilient electrode pad adapted for continuous contact with the well bore wall as the pad is moved past various formations within a well. In most cases the variables which effect the apparent resistivity detected by the contact log are the resistivity of the mud cake, the resistivity of the zone immediately behind the mud cake, and the thickness of the mud cake. The potentials representative of the mud cake resistivity and resistivity of the filtrate invaded formation are detected by means of electrodes contained within the pad. Generally, one current electrode and a plurality of potential electrodes are linearly spaced within the pad. The current electrode provides an essentially constant current into the formation to a return. A potential is picked between two other of the closely spaced potential electrodes which is primarily indicative of the mud cake plastered against the wall of the well bore. A second potential measurement is made from one potential electrode and the point of current return which is indicative of a deeper zone of investigation, primarily the resistivity of the zone immediately back of the mud cake flushed by the mud filtrate.

Laboratory experiments have shown, for a given mud, that the thickness of the mud cake is substantially constant and does not depend on the permeability of the filtrate invaded formation. It is thus possible, knowing the apparent resistivities and the mud filter cake resistivity, to determine the resistivity of the zone invaded by the mud filtrate and then, knowing the mud filtrate resistivity, to determine the porosity of the permeable formation.

Extensive work has been done to obtain data from both model and theoretical studies with which the porosity of the zone may be determined. Such work has resulted in charts and nomographs in which the values of the apparent resistivities, taken at a particular formation, may be inserted and porosity at a particular point calculated. Reference may be had to bulletin A–124 entitled, The Contact Log, and the bulletin A–101 entitled, Interpretation Charts for Electric Logs and Contact Logs, published by Welex, Inc. at Houston, Texas, for such charts and general information.

Such interpretation is of necessity time consuming and must be reperated for each incremental potential value picked within the well bore and as a result only the most promising formations are so plotted.

It is therefore the general objects of this invention to provide a method and apparatus for producing an indication of the formation porosity continuously and directly with the production of the apparent resistivities of the well bore formation.

Briefly described, the invention includes means for performing the steps of creating an electric field in the earth formations at selected points within the well bore, picking a first potential signal within said field primarily representative of the influence of a predetermined volume of adjacent earth formation, picking a second potential signal within said field primarily representative of the influence of a substantially smaller volume of said adjacent formation, and producing a third potential signal. The third potential signal is of predetermined relation to said first and second potential signals. A fourth potential signal is produced that is related to said third potential signal, a constant potential signal representative of drilling mud filtrate within said adjacent formation, and a second constant potential representative of drilling mud filter cake deposited on said adjacent formation. A fifth potential signal is produced that is the anti-logarithm of the sum of said fourth potential signal and a third predetermined constant potential that is representative of a predetermined relation to said adjacent formation. Said fifth potential signal may be recorded as an indication of said characteristic.

Further objects and advantages of the invention will become more apparent from the following detailed description taken in reference with the accompanying drawings in which:

FIGURE 1 is a schematic circuit diagram of a system which may be employed in accordance with the present invention.

FIGURE 2 illustrates a family of curves useful in establishing the related steps of the invention.

FIGURE 3 is a curve illustrating a further relation useful in establishing the related steps of the invention.

Theoretical investigation indicated that the resistivity of the invaded zone may be derived with knowledge of the apparent resistivities and the mud cake thickness. However, several limiting factors, such as the finite size and curvature of the pad and the presence of a mandrel behind the pad modify the actual response of the contact tool in the bore hole to differ from that foreseen by such investigation. For this reason a model study was made in order to determine the true response in view of the theoretical response.

The model consisted of a bore hole cut to scale in a porous stone. Salt water was used as the mud cake and the stone was saturated with salt water to simulate a zone flushed with mud filtrate. The model was appropriately calibrated in a salt bath and the potential distributions were mapped for various combinations of mud cake thickness. The results were plotted in the form of apparent resistivity versus mud cake resistivity in view of mud cake thickness for various relations of flushed zone resistivity versus mud cake resistivity. The comparison indicated sufficient diversity from the theoretical response to require a compromise.

Since an independent solution for flushed zone resistivity was not readily apparent from the theoretical and model study of investigation, a relation had to be discovered which would yield a relation of flushed zone resistivity to mud cake resistivity as a function of the apparent resistivities to mud cake resistivity for the short lateral (herein termed $3Zy$) and long normal (herein termed $2Zx$) potentials taken at the pad. This was done by making plots of various combinations of apparent resistivity versus mud cake resistivity for the two potentials in an attempt to determine a linear relation subject to empirical representation. After various relations were tried, a useful relation was discovered as follows:

$$\text{Log}\left[\frac{3Zy}{Rmc}\times\frac{2Zx}{Rmc}\right] \text{ vs. } \text{Log}\frac{2Zx}{Rmc} \quad (1)$$

For various values of $$\frac{Rxo}{Rmc}$$

Where:

$3Zy$ is the apparent resistivity picked between two adjacent potential electrodes,
$2Zx$ is the apparent resistivity picked between a potential electrode and the current return electrode,
$Rmc$ is the resistivity of the mud cake,
$Rxo$ is the resistivity of the flushed zone, and
$x$ and $y$ are spacing factors.

This relation, when applied to various values of $$\frac{Rxo}{Rmc}$$

reveals a series of straight parallel lines corresponding to the various values of $$\frac{Rxo}{Rmc}$$

Such curves are illustrated in FIGURE 2. The slope of each of these lines is 2.83. The above relation 1 may be represented as:

$$\text{Log}\left[\frac{3Zy}{Rmc}\times\frac{2Zx}{Rmc}\right]=2.83\ \text{Log}\frac{2Zx}{Rmc}+b \quad (2)$$

Where $b$ is the $y$ intercept of the $$\frac{Rxo}{Rmc}$$

curves. A further relationship between $b$ and $$\frac{Rxo}{Rmc}$$

which upon substitution will yield $$\frac{Rxo}{Rmc}$$

as function of $$\frac{3Zy}{Rmc}$$

and $$\frac{2Zx}{Rmc}$$

is next required.
A relation between $$\frac{Rxo}{Rmc}$$

and $b$, represented by a gradual curve on semi-log scale, was revealed by plotting $$\frac{Rxo}{Rmc}$$

versus $b$. Such curve is illustrated in FIGURE 3. Though no general equation has presently been discovered for this relation, two straight line equations intersecting at $$\frac{Rxo}{Rmc}=20$$

closely approximate this relation within a degree of acceptability required for the present invention. The equations of these lines are as follows:

$$\text{Log}\frac{Rxo}{Rmc}=-1.38b-.05$$

Or $$b=\frac{-\text{Log}\frac{Rxo}{Rmc}-.05}{1.38} \quad (3)$$

For values of $$\frac{Rxo}{Rmc}<20$$

and $$\text{Log}\frac{Rxo}{Rmc}=-3.6b-2.22$$

Or $$b=\frac{-\text{Log}\frac{Rxo}{Rmc}-2.22}{3.6} \quad (4)$$

For values of $$\frac{Rxo}{Rmc}>20$$

Relation 2 when reformed to include these values may be:

$$\text{Log}\frac{Rxo}{Rmc}=3.9\ \text{Log}\frac{2Zx}{Rmc}-1.38\ \text{Log}\left[\frac{2Zx}{Rmc}\times\frac{3Zy}{Rmc}\right]-.05 \quad (5)$$

For values of $$\frac{Rxo}{Rmc}<20$$

And $$\text{Log}\frac{Rxo}{Rmc}=10.2\ \text{Log}\frac{2Zx}{Rmc}-3.6\ \text{Log}\left[\frac{2Zx}{Rmc}\times\frac{3Zy}{Rmc}\right]-2.22 \quad (6)$$

For values of $$\frac{Rxo}{Rmc}>20$$

Such relations may be more conveniently expressed as follows:

$$\text{Log}\frac{Rxo}{Rmc}=2.52\ \text{Log}\frac{2Zx}{Rmc}-1.38\ \text{Log}\frac{3Zy}{Rmc}-.05 \quad (7)$$

For values of $$\frac{Rxo}{Rmc}<20$$

And $$\text{Log}\frac{Rxo}{Rmc}=6.6\ \text{Log}\frac{2Zx}{Rmc}-3.6\ \text{Log}\frac{3Zy}{Rmc}-2.22 \quad (8)$$

For values of $$\frac{Rxo}{Rmc}>20$$

The general relation for relations 7 and 8 would then be:

$$\text{Log} \frac{Rxo}{Rmc} = c \, \text{Log} \frac{2Zx}{Rmc} - d \, \text{Log} \frac{3Zy}{Rmc} - e \quad (9)$$

Where $c$, $d$ and $e$ are values obtained at incremental coordinates of the curve of FIGURE 3.

The steps of these relations may be performed by use of apparatus such as illustrated in FIGURE 1.

Referring to FIGURE 1, a contact resistivity well logging system is generally shown having a logging tool 12 suspended within a well bore 10. Connected to tool 12 is a logging pad 14, as previously described, having electrodes 16, 18 and 20 vertically disposed along its outer face. As shown, current is admitted from current electrode 16 which flows to a return electrode 22. A potential is picked across electrodes 18 and 20, such potential being the $3Zy$ signal previously mentioned as being primarily representative of an extremely close zone of investigation. A second potential is picked between the potential electrode 20 and return electrode 22, such potential being primarily representative of the flushed zone previously mentioned as being the $2Zx$ signal. The detected potentials are connected into an FM transmission system 24 and conducted over a well logging cable 26, herein exampled as being of single conductor, and received at an FM receiver 28. For further illustration of FM well logging transmission systems, reference may be had to Patent No. 2,573,133 to Greer.

The demodulated signals from receiver 28 may be fed directly into a logging recorder at terminals 90 and 92 and are fed into the relation network at 30 and 32. The $2Zx$ signal feeds into a multiplying circuit 30 a logarithmic operational amplifier 34, a constant circuit 40 or 46, and a summing operational amplifier 58. The $3Zy$ signal feeds into a multiplier circuit 32, a logarithmic operational amplifier 36, a minus operational amplifier 38, a constant circuit 42 or 48, and summing amplifier 58.

The term operational amplifier, as used herein, denotes a high gain minimum drift amplifier which, when provided with appropriate input and feed-back elements, will produce an output signal having predetermined relation with an input signal or signals. An example amplifier of this type which has been used with great utility in the circuit disclosed is the model K2–X or K2–W operational amplifier supplied by the George A. Philbrick Researches Inc., Boston, Massachusetts. For extensive illustration of the construction and application of amplifiers of this type, reference may be had to Korn and Korn, Electronic Analog Computers, McGraw-Hill Book Company, 1952.

The circuit as illustrated through amplifier 58 serves to perform the steps of the relations 7 and 8. Circuit 30 receives the $2Zx$ signal and feeds a signal into logarithmic amplifier 34 related to the $2Zx$ signal as $$\frac{2Zx}{Rmc}$$

Amplifier 34 converts the $$\frac{2Zx}{Rmc}$$

signal to $$\text{Log} \frac{2Zx}{Rmc}$$

such signal then being fed through constant circuits 40 or 46 and being modified by constants $K_1$ or $K_{1a}$ for summation at amplifier 58.

The $3Zy$ signal becomes the $$\frac{3Zy}{Rmc}$$

through circuit 32, the $$\text{Log} \frac{3Zy}{Rmc}$$

through logarithmic amplifier 36, then converted to the $$-\text{Log} \frac{3Zy}{Rmc}$$

through minus amplifier 38. The $$-\text{Log} \frac{3Zy}{Rmc}$$

signal is then modified by constants $K_2$ or $K_{2a}$ at 42 or 48 respectively for summation in amplifier 58.

The logarithmic amplifiers 34 and 36 produce an output related as the log of the input by virtue of the feed-back network illustrated as diodes connected in parallel opposition, each diode having a D.C. voltage series connected with minus polarity to its plate. It is known that a thermionic vacuum diode, when operated in a negative plate potential region as shown, will produce a plate current proportional to the logarithm of the grid input voltage within a limited range of the input voltages. It was found, by operating a 6SK7 in an inverted circuit, as shown, that consistant signal values were produced. Since, with low voltages impressed across the diode the back resistance goes very high, it may be necessary to shunt the feed-back loop with a resistor to limit the value of back resistance and hence keep down noise.

The alternate constants, $K_1$ and $K_{1a}$, $K_2$ and $K_{2a}$, $K_3$ and $K_{3a}$, indicated at circuits 40, 42, 44, 46, 48 and 50 respectively, are the constants respectively substituted into Equations 7 and 8 as supplied from the Equations 3 and 4. As illustrated, circuits 40 through 50 also provide the proper input impedances for amplifier 58. When the output signal of summing amplifier 58 is below a value representative of $$\frac{Rxo}{Rmc} = 20$$

as illustrated in FIGURE 3, the circuits 40, 42 and 44 are in circuit, providing constants $K_1$, $K_2$ and $K_3$ for relation 7 to modify the $2Zx$ and $3Zy$ signals. When the output of summing amplifier 58 is above such representative value, circuits 46, 48 and 50 are in circuit, supplying the constants $K_{1a}$, $K_{2a}$ and $K_{3a}$, representative of relation 8. These alternate constant circuits are automatically switched by a switch circuit 60 which shifts switches 52, 54 and 56 upon reception of a signal value representative of the straight line intersection of FIGURE 3. It is thus seen that the $$\text{Log} \frac{Rxo}{Rmc}$$

signal output of summing amplifier 58 remains closely approximate to the curve of FIGURE 3. The $$\text{Log} \frac{Rxo}{Rmc}$$

signal may be directly recorded from a terminal 94 if desired.

It is pointed out that the switch circuits 60 and alternate constant circuits 40 through 50 could be replaced, for example, by a servo-positioning circuit, responsive to the output of amplifier 58, which could concurrently drive constant potentiometers having variable windings corresponding to the curve of FIGURE 3 and thus each continuously supply a constant in accord with each output increment of amplifier 58.

In operation, logging tool 12 is passed through a well bore and the $2Zx$ and $3Zy$ potential signals are picked from succeeding formations. These signals are transmitted to the earth's surface and introduced into circuits 30 and 32. The $2Zx$ signal is multiplied by a $$\frac{1}{Rmc}$$

value at circuit 30, converted into $$\text{Log} \frac{2Zx}{Rmc}$$

through amplifier 34, modified by constants $K_1$ or $K_{1a}$ at circuits 40 or 46, and introduced in summing amplifier 58. The $3Zy$ signal is multiplied by the $$\frac{1}{Rmc}$$

value by circuit 32, converted to $$\text{Log} \frac{3Zy}{Rmc}$$

through amplifier 36, converted to $$-\text{Log} \frac{3Zy}{Rmc}$$

through amplifier 38, and modified by constant $K_2$ or $K_{2a}$ at circuits 42 or 48 for introduction into summing amplifier 58. Constants $K_3$ or $K_{3a}$ are supplied by circuits 44 or 50 into summing amplifier 58. Summing amplifier 58 sums such respective signals and produces an output representative of $$\text{Log} \frac{Rxo}{Rmc}$$

Switch 60, in response to the relative output of amplifier 58, switch the alternate constant factors into circuit as required. As previously mentioned, such constant factors may be continuously varied in accordance with the relation represented by the curve of FIGURE 3.

Once the $$\text{Log} \frac{Rxo}{Rmc}$$

relation has been attained, as previously described, the actual porosity may be obtained by the steps found in the following relations. It is pointed out that other steps may be employed for obtaining actual porosity once the $$\text{Log} \frac{Rxo}{Rmc}$$

relation is known; the following relation is therefore disclosed as one means of such attainment.

The following relation applied to a "flushed zone" dictates that:

$$\frac{Rxo}{Rmf} = \frac{F}{(1-ROS)^2} \quad (10)$$

Where:

$Rmf$ is a resistivity of the mud filtrate
$F$ is the formation factor and
$ROS$ is the assumed residual oil saturation.

This ROS factor is not exactly known, but can be taken as approximately equal to the statistical value of the percent per pore volume of the residual oil found in recovered cores, i.e., from about 10% to 30%.

It is known, if the formation is practically clean and is impregnated with an electrolyte, that the ratio of resistivity of the formation to resistivity of the electrolye is a constant, whatever the resisitivity of the electrolyte. This constant, designated as formation resistivity factor or more simply, formation factor, in turn is a function of the lithology of the formations, and mostly of the porosity.

Relation (10) may be combined with the following relation derived by the Humble Oil and Refining Company:

$$F = \frac{.62}{\phi^{2.15}} \quad (11)$$

Where $\phi$ is the porosity to yield:

$$\phi^{2.15} = \frac{.62}{\frac{Rxo}{Rmf}(1-ROS)^2}$$

This may be reformed as:

$$\text{Log } \phi = \frac{\text{Log } .62 - \text{Log } \frac{Rxo}{Rmf} - \text{Log }(1-ROS)^2}{2.15} \quad (12)$$

Or:

$$2.15 \text{ Log } \phi = [\text{Log } .62 - \text{Log }(1-ROS)^2] - \text{Log } \frac{Rxo}{Rmf} \quad (13)$$

Apparatus employed in the performance of the steps of relation (13) is further illustrated in FIGURE 1. The $$\text{Log} \frac{Rxo}{Rmc}$$

signal feeds through a circuit 62 into a summing amplifier 68. A circuit 64 feeds a signal representative of $+\text{Log } Rmc$ into summing amplifier 68. A circuit 66 feeds a signal representative of $-\text{Log } Rmf$ into the summing amplifier 68. Circuits 62, 64 and 66 also include proper input impedances for amplifier 68. When $$\text{Log} \frac{Rxo}{Rmc}$$

signal has subtracted therefrom $+\text{Log } Rmf$ and added thereto $-\text{Log } Rmc$ the resulting output of amplifier 68 will be $$\text{Log} \frac{Rxo}{Rmf}$$

This signal may be directly recorded in a logging recorder connected to terminal 96. It is pointed out that in many cases the $$\text{Log} \frac{Rxo}{Rmc}$$

or $$\text{Log} \frac{Rxo}{Rmf}$$

found at terminals 94 and 96 may be preferred by some not in accord with empirical relation (13).

The output of summing amplifier 68, representative of $$\text{Log} \frac{Rxo}{Rmf}$$

is introduced into branch circuits for the purpose of determining the porosity with the ROS assumed arbitrarily at 10% and 20% respectively. In performing the steps of relation (13) the $$\text{Log} \frac{Rxo}{Rmf}$$

signal is introduced into circuit 70 which modifies the signal as the function of $\text{Log } .62 - \text{Log }(1-ROS)^2$ with the ROS at 10% in connection with summing amplifier 74. The output of summing amplifier 74 is then $2.15 \text{ Log } \phi$ at 10%. This output is fed into circuit 78 and modified with a constant representative of $$\frac{1}{2.15}$$

The output of circuit 78 is then representative of the Log $\phi$ at 10% ROS. The alternate branch includes a circuit 72 which modifies $$\text{Log} \frac{Rxo}{Rmf}$$

to $2.15 \text{ Log } \phi$ at 20% in connection with summing amplifier 76. This signal is modified by a constant circuit 80 identical to circuit 78. The output of circuit 80 is then representative of the Log $\phi$ at 20% ROS. These two signals may be directly recorded by connection of terminals 98 and 100 to an appropriate logging recorder.

If $\phi$ at 10% ROS and 20% ROS respectively is desired to be recorded directly, the signal is further fed through an anti-logarithm circuit 82 which serves as an input to an operational amplifier 84. Circuit 82 and amplifier 84 in combination produce a signal representative of the anti-logarithm of the input to circuit 82. The output of amplifier 84 is then representative of $\phi$ at 10% ROS and the output of like circuit 86 and amplifier 88 is representative of $\phi$ at 20% ROS. Circuits 82 and 86 may employ diodes operated in the negative plate potential region as previously mentioned for amplifier 34. These signals may be recorded from terminals 102 and 104.

In operation the $$\text{Log} \frac{Rxo}{Rmc}$$

signal is converted to a $$\text{Log} \frac{Rxo}{Rmf}$$

signal by circuits 62, 64, 66 and summing amplifier 68. A Log $\phi$ at 10% ROS signal is produced from the $$\text{Log} \frac{Rxo}{Rmf}$$

signal by circuit 70, summing amplifier 74, and constant circuit 78. A Log $\phi$ at 20% ROS signal is produced from the $$\text{Log} \frac{Rxo}{Rmf}$$

by circuit 72, summing amplifier 76, and constant circuit 80. A $\phi$ at 10% ROS signal is produced from the Log $\phi$ at 10% ROS signal by anti-logarithm circuit 82 and operational amplifier 84. A $\phi$ at 20% ROS signal is produced from the Log $\phi$ at 20% ROS signal by anti-logarithm circuit 86 and operational amplifier 88.

It is now seen that the disclosed circuit will produce for concurrent recordation the $2Zx$ and $3Zy$ signals in conjunction with the $$\text{Log} \frac{Rxo}{Rmc}$$

$$\text{Log} \frac{Rxo}{Rmf}$$

Log $\phi$ at 10% ROS, Log $\phi$ at 20% ROS, $\phi$ at 10% ROS, and $\phi$ at 20% ROS. As previously mentioned, the $$\text{Log} \frac{Rxo}{Rmc}$$

or $$\text{Log} \frac{Rxo}{Rmf}$$

recorded in conjunction with the $2Zx$ and $3Zy$ signals may be the preferred relation desired by some. With others the Log $\phi$ at 10% and 20% or $\phi$ at 10%, or 20% ROS signals may be preferred. In any event all or any combination of these representative signals are made available for recordation by the disclosed apparatus.

Ideally the circuit as disclosed should be a compact package for rack mounting on a well logging truck, allowing direct recording of the various signals in conjunction with the logging operation while on field location. It is, of course, obvious that various bias controls should be available with the system for zeroing or adjusting the off-set of each amplifier and for calibration of various constant values. Each operational amplifier should be balanced prior to each run. Equipment for such adjustment will be obvious to those skilled in this art.

A comparison of the results produced by the apparatus employed in this invention and those calculated indicates that this invention will provide values within 0.5%. This includes the $$\text{Log} \frac{Rxo}{Rmc}$$

$$\text{Log} \frac{Rxo}{Rmf}$$

and values of $\phi$. Since actual porosity measurements are accurate only to this figure, the values obtained by this invention are certainly acceptable.

A further advantage of the system employed in this invention is its use as an experimental tool to immediately determine the effect of various simulated bore hole conditions. Such use would eliminate an indeterminate number of calculations or uses of nomographs as is presently necessary.

It is obvious that the system herein disclosed for producing the relations obtained from the obtained bore hole signals may take many forms familiar to those skilled in this art. It is also to be understood that the relations disclosed may be manipulated to change their form without altering equivalent relations therein established. Accordingly, the system illustrated is exemplary only and should be construed as limiting the invention only as defined in the appended claims.

That which is claimed is:

1. In apparatus for obtaining a porosity characteristic of earth formations traversed by a well bore, means for creating an electric field in the earth formations at selected points within the well bore, means for detecting a first potential signal within said field representative of the influence of a predetermined volume of adjacent earth formation, means for detecting a second potential signal within said field representative of the influence of a substantially smaller volume of said adjacent formation, means connected with said first and second signal detecting means for producing a third potential signal related to said first and second potential signals as a sum including, a fourth potential signal that is a ratio of the logarithm of a ratio of said first potential signal and a first predetermined constant potential partly representative of the deposited mud filter cake influence of said adjacent formation, and a second predetermined constant potential, said second constant potential being of representative relation to a first predetermined function relating said third potential signal to a second predetermined function, said second function relating said first potential signal to the product of said first and said second potential signals, a fifth potential signal that is a ratio of the logarithm of a ratio of said second potential signal and said first constant potential, a third predetermined constant potential, said third constant potential being of representative relation to said first function, and a fourth predetermined constant potential, said fourth constant potential being of representative relation to said first function, means connected with said third potential signal producing means for producing a sixth potential signal that is the sum of said third potential signal, a fifth constant potential signal representative of the mud filtrate within said adjacent formation, and a minus signal related as the logarithm of said first constant potential, and means connected to said sixth signal producing means for producing a seventh potential signal that is the anti-logarithm of the sum of said sixth potential signal and a sixth predetermined constant potential representative of residual oil saturation of said adjacent formation, and means connected to said seventh signal producing means for indicating potential signal as an indication of said characteristic.

2. In apparatus for obtaining a characteristic indicative of the porosity of earth formations traversed by a well bore filled with drilling mud, comprising, means for creating an electric field in the earth formations at selected points within the well bore, means for detecting a first potential signal within said field that is representative of the influence of a predetermined volume of adjacent formation, means for detecting a second potential signal within said field representative of a substantially smaller volume of said adjacent formation, means connected to said first and second signal detecting means for generating a third potential signal corresponding to said first and second potential signals in the relationship, $$\text{Third potential signal} = c \text{ Log} \frac{2Zx}{Rmc} - d \text{ Log} \frac{3Zy}{Rmc} - e$$

where; $2Zx$ is said first potential signal, $3Zy$ is said second potential signal, $Rmc$ is a constant representative of the drilling mud filter cake resistivity, and $c$, $d$, and $e$ are constants established as a predetermined function of said third signal, means connected to said third signal generating means for generating a fourth signal related to said third signal as the sum of said third signal, a constant signal representative of the drilling mud filtrate resistivity, and a constant potential related as the logarithm of said mud cake resistivity constant, means connected to said fourth signal generating means for generating a fifth potential signal related to said fourth potential signal as the sum of said fourth potential signal and a predetermined constant representative of an assumed residual oil saturation of said adjacent formation, and means connected to said fifth signal generating means for indicating said fifth potential as said earth formation characteristic.

3. In apparatus for obtaining a porosity characteristic of earth formations traversed by a drilling mud filled well bore, means for creating an electrical field at selected points within said well bore, means for detecting a first potential signal within said well bore representative of the influence of a predetermined volume of adjacent earth formation, means for detecting a second potential signal within said well bore representative of the influence of a substantially smaller volume of said adjacent formation, means connected with said first and second potential detection means for generating a third potential signal representative of said characteristic related to said first and second potential signals in dependence upon a predetermined mathematical function, an assumed resistivity of the drilling mud filter cake, an assumed resistivity of the drilling mud filtrate, and an assumed percentage residual oil saturation of said adjacent formation, and means in connection with said third signal generating means for indicating said third potential signal as an indication of said characteristic.

4. A system for obtaining a porosity characteristic of earth formations traversed by a well bore, comprising, means for creating an electrical field in the earth formations at selective points within the well bore, means for detecting a first potential signal within said field representative of the influence of a predetermined volume of adjacent earth formations, means for detecting a second potential signal within said field representative of the influence of a substantially smaller volume of said adjacent formation, means connected with said first and second signal detecting means for producing a third potential signal related to said first and second potential signals as a sum including a fourth potential signal that is a ratio of the logarithm of a ratio of said first potential signal and a first constant potential representative of the electrical resistivity of a drilling mud filter cake deposited on said adjacent formation, and a second predetermined constant potential, said second constant potential being of representative relation to a first predetermined function which relates said third potential signal to the ordinate intercept of a second predetermined function, said second function relating said first signal with the product of said first potential signal and said second potential signal, a fifth minus potential signal that is a ratio of the logarithm of a ratio of said second potential signal and said first constant potential and a third predetermined constant potential, said third constant potential being of predetermined relation to said first function, and a fourth constant potential, said fourth constant potential being of predetermined relation to said first function, means connected with said third signal producing means for producing a sixth potential signal relating to said third potential signal as the sum of said third potential signal, a fifth constant potential representative of the electrical resistivity of a drilling mud filtrate, and a minus sixth constant potential related as the logarithm of said first constant potential, and means connected with said sixth signal producing means for producing a seventh potential signal that is the antilogarithm of the sum of said sixth potential signal and a seventh constant potential representative of an assumed residual oil saturation of said adjacent formation, and means connected with said seventh signal producing means for indicating said seventh potential signal as indication of said characteristic.

5. In apparatus for obtaining a characteristic of earth formations traversed by a well bore, means for creating an electric field in the earth formations at selected points within the well bore, means for detecting a first potential signal within said field representative of the influence of a predetermined volume of adjacent earth formation, means for detecting a second potential signal within said field representative of the influence of a substantially smaller volume of said adjacent formation, means connected with said first and second signal detecting means for producing a third potential signal related to said first and second potential signals as a sum including, a fourth potential signal that is a ratio of the logarithm of a ratio of said first potential signal and a first predetermined constant potential representative of the deposited mud filter cake on said adjacent formation, and a second predetermined constant potential, said second constant potential being of representative relation to a first predetermined function relating said third potential signal to a second predetermined function, said second function relating said first potential signal to the product of said first and said second potential signals, a fifth potential signal that is a ratio of the logarithm of a ratio of said second potential signal and said first constant potential, a third predetermined constant potential, said third constant potential being of representative relation to said first function, and a fourth constant potential, said fourth constant potential being of representative relation to said first function, means connected with said third signal producing means for producing a sixth potential signal that is the sum of said third potential signal, a fifth constant potential signal representative of the mud filtrate within said adjacent formation, and a minus signal related as the logarithm of said constant potential, and means connected with said sixth signal producing means for indicating said sixth potential signal as an indication of said characteristic.

6. In apparatus for obtaining an indication of the porosity of earth formations traversed by a well bore, means for creating an electric field in the earth formations at selected points within the well bore, means for detecting a first potential signal within said field that is representative of the influence of a predetermined volume of adjacent formation, means for detecting a second potential signal within said field representative of a substantially smaller volume of said adjacent formation, means connected with said first and second signal detecting means for generating a third potential signal corresponding to said first and second potential signals in the relationship, $$\text{Third potential signal} = c \text{ Log} \frac{2Zx}{Rmc} - d \text{ Log} \frac{3Zy}{Rmc} - e$$

where; $2Zx$ is said first potential signal, $3Zy$ is said second potential signal, $Rmc$ is a constant representative of a drilling mud filter cake resistivity, and $c$, $d$, and $e$ are constants established as a predetermined function of said third signal, means connected with said third signal generating means for generating a fourth signal related to said third signal as the sum of said third signal, a constant signal representative of the drilling mud filtrate resistivity, and a minus constant potential related as the logarithm of said mud cake resistivity constant, and means connected with said fourth signal generating means for indicating said fourth signal as a porosity indication of said adjacent earth formation.

7. A system for obtaining a porosity characteristic of earth formations traversed by a well bore, comprising means for creating an electrical field in the earth formations at selective points within the well bore, means for detecting a first potential signal within said field representative of the influence of a predetermined volume of adjacent earth formations, means for detecting a second potential signal within said field representative of the influence of a substantially smaller volume of said adjacent formation, means connected with said first and second signal detecting means for producing a third potential signal related to said first and second potential signals as a sum including a fourth potential signal that is a ratio of the logarithm of a ratio of said first potential signal and a first constant potential representative of the electrical resistivity of a drilling mud filter cake deposited on said adjacent formation, and a second predetermined constant potential, said second constant potential being of representative relation to a first predetermined function which relates said third potential signal to the ordinate intercept of a second predetermined function, said second function relating said first potential signal to the product of said first and second potential signal, a fifth minus potential signal that is a ratio of the logarithm of a ratio of said second potential signal and said first constant potential, and a third predetermined constant potential, said third constant potential being of predetermined relation to said first function, and a fourth constant potential, said fourth constant potential being of predetermined relation to said first function, means connected with said third signal producing means for producing a sixth potential signal relating to said third potential signal as the sum of said third potential signal, a fifth constant potential representative of the electrical resistivity of a drilling mud filtrate, and a minus sixth constant potential related as the logarithm of said first constant potential, and means connected with said sixth signal producing means for indicating said sixth potential signal as indication of said characteristic.

8. In a system for obtaining a porosity characteristic of earth formations traversed by a well bore, comprising means for creating an electric field in the earth formations at selected points within the well bore, means for detecting a first potential signal within said field representative of the influence of a predetermined volume of adjacent earth formation, means for detecting a second potential signal within said field representative of the influence of a substantially smaller volume of said adjacent formation, means connected with said first and second signal detecting means for producing a third potential signal related to said first and second potential signals as a sum including, a fourth potential signal that is a ratio of the logarithm of a ratio of said first potential signal and a first predetermined constant potential representative of the deposited mud filter cake on said adjacent formation, and a second predetermined constant potential, said second constant potential being of representative relation to a first predetermined function relating said third potential signal to a second predetermined function, said second function relating said first potential signal to the product of said first and second potential signals, a fifth potential signal that is a ratio of the logarithm of a ratio of said second potential signal and said first constant potential, and a third predetermined constant potential, said third constant potential being of representative relation to said first function, and a fourth predetermined constant potential, said fourth predetermined constant potential being of representative relation to said first function, and means connected with said third signal producing means for indicating said third potential signal as an indication of said characteristic.

9. In a system for obtaining an indication of the porosity of earth formations traversed by a well bore, means for creating an electric field in the earth formations at selected points within the well bore, means for detecting a first potential signal within said field that is representative of the influence of a predetermined volume of adjacent formation, means for detecting a second potential signal within said field representative of a substantially smaller volume of said adjacent formation, means connected with said first and second signal detecting means for generating a third potential signal corresponding to said first and second potential signals in the relationship, $$\text{Third potential signal} = c \, \text{Log} \, \frac{2Zx}{Rmc} - d \, \text{Log} \, \frac{3Zy}{Rmc} - e$$

where; $2Zx$ is said first potential signal, $3Zy$ is said second potential signal, $Rmc$ is a constant representative of drilling mud filter cake resistivity, and $c$, $d$, and $e$ are constants established as a predetermined function of said third signal, and means connected with said third signal producing means for indicating said third potential signal as said porosity indication.

10. A system for obtaining a porisity characteristic of earth formations traversed by a well bore, comprising, means for creating an electrical field in the earth formations at selective points within the well bore, means for detecting a first potential signal within said field representative of the influence of a predetermined volume of adjacent earth formations, means for detecting a second potential signal within said field representative of the influence of a substantially smaller volume of said adjacent formation, means connected with said first and second signal detecting means for producing a third potential signal related to said first and second potential signals as a sum including a fourth potential signal that is a ratio of the logarithm of a ratio of said first potential signal and a first constant potential representative of the electrical resistivity of a drilling mud filter cake deposited on said adjacent formation, and a second predetermined constant potential, said second constant potential being of representative relation to a first predetermined function which relates said third potential signal to the ordinate intercept of a second predetermined function, said second function relating to said third signal and the product of said first potential signal and said second potential signal, a fifth minus potential signal that is a ratio of the logarithm of a ratio of said second potential signal and said first constant potential and a third predetermined constant potential, said third constant potential being of predetermined relation to said first function, and a fourth constant potential, said fourth constant potential being of predetermined relation to said first function, and means connected with said third signal producing means for indicating said third potential signal as indication of said characteristic.

11. In apparatus suitable for obtaining a porosity characteristic of earth formations traversed by a drilling mud filled well bore, means receiving a first potential signal representative of the influence of a predetermined volume of adjacent earth formation traversed by said bore and a second potential signal representative of the influence of a substantially smaller volume of said adjacent formation for producing a third potential signal representative of said characteristic related to said first and second potential signals in dependence on a predetermined mathematical function, an assumed resistivity of the drilling mud filter cake, an assumed resistivity of the drilling mud filtrate, and an assumed percentage residual oil saturation of said adjacent formation, and means connected with said third potential signal means for indicating said third potential signal as an indication of said characteristic.

12. In apparatus suitable for obtaining a porosity characteristic of earth formations traversed by a drilling mud filled well bore, means receiving a first potential signal representative of the influence of a predetermined volume of adjacent earth formation traversed by said bore and a second potential signal representative of the influence of a substantially smaller volume of said adjacent formation for producing a third potential signal representative of said characteristic related to said first and second potential signals in dependence on a predetermined mathematical function, and an assumed resistivity of the drilling mud filter cake, and means connected with said third potential signal producing means for indicating said third potential signal as an indication of said characteristic.

13. In apparatus suitable for obtaining a porosity characteristic of earth formations traversed by a drilling mud filled well bore, means receiving a first potential signal representative of the influence of a predetermined volume of adjacent earth formation traversed by said bore and a second potential signal representative of the influence of a substantially smaller volume of said adjacent formation for producing a third potential signal representative of said characteristic related to said first and second potential signals in dependence on a predetermined mathematical function, an assumed resistivity of drilling mud filter cake, and an assumed resistivity of the drilling mud filtrate and means connected with said third potential signal producing means for indicating said third potential signal as an indication of said characteristic.

14. An apparatus suitable for obtaining an indication of porosity of earth formations traversed by a well bore, means receiving a first potential signal representative of the influence of a predetermined volume of adjacent formation traversed by said bore and a second potential signal representative of a substantially smaller volume of said adjacent formation for generating a third signal corresponding to said first and second potential signals in the relationship, $$\text{Third potential signal} = c \, \text{Log} \, \frac{2Zx}{Rmc} - d \, \text{Log} \, \frac{3Zy}{Rmc} - e$$

where; $2Zx$ is said first potential signal, $3Zy$ is said second potential signal, $Rmc$ is a constant representative of a drilling mud filter cake resistivity, and $c$, $d$ and $e$ are constants established as a predetermined function of said third signal, means in connection with said third signal producing means for producing a fourth signal related to said third signal as the sum of said third signal, a constant signal representative of the drilling mud filtrate resistivity, and a constant potential related as the logarithm of said mud cake resistivity constant, means connected to said fourth signal generating means for generating a fifth signal related to said fourth signal as the sum of said fourth signal and a predetermined constant representative of an assumed residual oil saturation of said adjacent formation, and means connected with said fifth signal generating means for indicating said fifth signal as said earth formation characteristic.

15. An apparatus suitable for obtaining an indication of porosity of earth formations traversed by a well bore, means receiving a first potential signal representative of the influence of a predetermined volume of adjacent formation traversed by said bore and a second potential signal representative of a substantially smaller volume of said adjacent formation for generating a third signal corresponding to said first and second potential signals in the relationship, $$\text{Third potential signal} = c \, \text{Log} \, \frac{2Zx}{Rmc} - d \, \text{Log} \, \frac{3Zy}{Rmc} - e$$

where; $2Zx$ is said first potential signal, $3Zy$ is said second potential signal, $Rmc$ is a constant representative of a drilling mud filter cake resistivity, and $c$, $d$ and $e$ are constants established as a predetermined function of said third signal, means in connection with said third signal producing means for producing a fourth signal related to said third signal as the sum of said third signal, a constant signal representative of the drilling mud filtrate resistivity, and a minus constant potential related as the logarithm of said mud cake resistivity constant, and means connected with said fourth signal generating means for indicating said fourth signal as a porosity indication of said adjacent earth formation.

16. An apparatus suitable for obtaining an indication of porosity of earth formations traversed by a well bore, means receiving a first potential signal representative of the influence of a predetermined volume of adjacent formation traversed by said bore and a second potential signal representative of a substantially smaller volume of said adjacent formation for generating a third signal corresponding to said first and second potential signals in the relationship, $$\text{Third potential signal} = c \, \text{Log} \, \frac{2Zx}{Rmc} - d \, \text{Log} \, \frac{3Zy}{Rmc} - e$$

where; $2Zx$ is said first potential signal, $3Zy$ is said second potential signal, $Rmc$ is a constant representative of a drilling filter cake resistivity, and $c$, $d$ and $e$ are constants established as a predetermined function of said third potential signal, means in connection with said third signal producing means for indicating said third signal as said porosity indication.

References Cited in the file of this patent

UNITED STATES PATENTS 2,669,688    Doll _____ Feb. 16, 1954